US009131489B2

(12) United States Patent
Feng et al.

(10) Patent No.: US 9,131,489 B2
(45) Date of Patent: Sep. 8, 2015

(54) RESOURCE ALLOCATION METHOD AND APPARATUS

(75) Inventors: Shulan Feng, Beijing (CN); Jinnan Liu, Beijing (CN); Yajuan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 13/543,516

(22) Filed: Jul. 6, 2012

(65) Prior Publication Data

US 2012/0275428 A1 Nov. 1, 2012

Related U.S. Application Data (63) Continuation of application No. PCT/CN2010/070074, filed on Jan. 8, 2010.

(51) Int. Cl.
*H04W 4/00* (2009.01)
*H04W 72/04* (2009.01)
*H04L 5/00* (2006.01)

(52) U.S. Cl.
CPC ............ *H04W 72/042* (2013.01); *H04L 5/001* (2013.01); *H04L 5/0039* (2013.01); *H04L 5/0064* (2013.01); *H04L 5/0087* (2013.01); *H04L 5/0092* (2013.01); *H04W 72/0453* (2013.01)

(58) Field of Classification Search
USPC ......... 370/322, 329, 330, 341, 348, 443, 436, 370/468, 395.4, 395.21
See application file for complete search history.

(56) References Cited

U.S. PATENT DOCUMENTS

| 2006/0277550 | A1* | 12/2006 | Williams et al. ............ 718/107 |
| 2009/0201875 | A1* | 8/2009 | Hasegawa et al. ........... 370/329 |
| 2009/0316811 | A1* | 12/2009 | Maeda et al. ................ 375/260 |
| 2010/0008310 | A1 | 1/2010 | Gerstenberger et al. |

(Continued)

FOREIGN PATENT DOCUMENTS

| CN | 101127719 A | 2/2008 |
| CN | 101146317 A | 3/2008 |
| CN | 101155400 A | 4/2008 |

(Continued)

OTHER PUBLICATIONS

International Search Report and Written Opinion of the International Searching Authority issued in corresponding PCT Patent Application No. PCT/CN2010/070074, mailed Oct. 28, 2010.

(Continued)

*Primary Examiner* — Zewdu A Beyen
(74) *Attorney, Agent, or Firm* — Brinks Gilson & Lione (57) ABSTRACT

Embodiments of the present invention relate to the communication field, and disclose a resource allocation method, apparatus, and system, which solve a problem that the size of resource allocation indication information increases with the increase of the transmission bandwidth, and redundancy of physical layer signaling increases with the increase of the transmission bandwidth. The method includes: allocating time-frequency resources in specific bandwidth to a terminal, where the specific bandwidth is a band less than or equal to system bandwidth; determining the size of resource allocation information according to the specific bandwidth; and sending the resource allocation information to the terminal to indicate the allocated time-frequency resources. The embodiments of the present invention are mainly applied to the process in which the base station allocates time-frequency resources to the terminal.

5 Claims, 6 Drawing Sheets

(56) References Cited

U.S. PATENT DOCUMENTS

2010/0075693 A1* 3/2010 Kishigami et al. ......... 455/452.2
2011/0044261 A1* 2/2011 Cai et al. ..................... 370/329

FOREIGN PATENT DOCUMENTS

| CN | 101272615 A | 9/2008 |
| CN | 101459588 A | 6/2009 |
| EP | 2057799 A2 | 5/2009 |
| WO | WO 2007083081 A1 * | 7/2007 |

OTHER PUBLICATIONS

Office Action issued in corresponding Chinese Patent Application No. 201080003276.5, mailed Jul. 18, 2013, 10 pages.
Office Action issued in corresponding Chinese Patent Application No. 201080003276.5, mailed Nov. 1, 2012.

* cited by examiner

A base station allocates two discontinuous terminal-specific bandwidth to a terminal

Map the two discontinuous terminal-specific bandwidth to one continuous virtual terminal-specific bandwidth The base station transmits the resource information according to the position of the allocated resource in the virtual terminal-specific bandwidth The terminal restores the position of the allocated resource in the system bandwidth of the base station

FIG. 12

RESOURCE ALLOCATION METHOD AND APPARATUS

This application is a continuation of International Application No. PCT/CN2010/070074, filed on Jan. 8, 2010, which is hereby incorporated by reference in the entirety.

FIELD OF THE INVENTION

The present invention relates to the field of communication technologies, and in particular, to a resource allocation method and apparatus.

BACKGROUND OF THE INVENTION

In a cellular system, a base station is connected to multiple terminals. The base station allocates resources to each terminal for communication with the base station, and notifies a resource allocation message to the terminal. After receiving the resource allocation message sent by the base station, the terminal obtains, according to the resource allocation message, time-frequency resources for receiving downlink signals and sending uplink signals.

In an existing system, the time-frequency resources allocated to the terminal may be a part of time-frequency resources selected by the base station in the entire system bandwidth. The system bandwidth is a bandwidth that is preconfigured by a system and has a fixed size. In this way, the resource allocation indication information for indicating the time-frequency resources of the terminal includes an uplink resource allocation message and downlink resource allocation indication information. The system needs to indicate the allocated time-frequency resources in the system bandwidth of a fixed size, and therefore, the size of the indication information increases with the increase of the system bandwidth, which causes that redundancy of physical layer signaling increases with the increase of the system bandwidth. That is to say, the size of the indication information is limited by the system bandwidth.

SUMMARY OF THE INVENTION

Embodiments of the present invention provide a resource allocation method and apparatus, so as to indicate allocated time-frequency resources.

To fulfill the foregoing objective, the embodiments of the present invention employ the following technical solutions:

A resource allocation method includes:

allocating time-frequency resources in specific bandwidth to a terminal, where the specific bandwidth is a band less than or equal to system bandwidth;

determining the size of resource allocation information according to the specific bandwidth; and sending the resource allocation information to the terminal to indicate the allocated time-frequency resources.

A resource allocation method includes:

receiving resource allocation information sent by a base station, where the resource allocation information is used for indicating time-frequency resources allocated by the base station to a terminal;

obtaining the allocated time-frequency resources from used specific bandwidth according to the indication of the resource allocation information, where the specific bandwidth is a band less than or equal to system bandwidth; and using the allocated time-frequency resources to transmit data.

A base station includes:

a resource allocating unit, configured to allocate time-frequency resources in specific bandwidth to a terminal, where the specific bandwidth is a band less than or equal to system bandwidth;

a determining unit, configured to determine the size of resource allocation information according to the specific bandwidth; and a resource allocation information sending unit, configured to send the resource allocation information to the terminal to indicate the allocated time-frequency resources.

A terminal includes:

a resource allocation information receiving unit, configured to receive resource allocation information sent by a base station, where the resource allocation information is used for indicating time-frequency resources allocated by the base station to the terminal;

an obtaining unit, configured to obtain the allocated time-frequency resources from used specific bandwidth according to the indication of the resource allocation information, where the specific bandwidth is a band less than or equal to system bandwidth; and a data transmitting unit, configured to use the allocated time-frequency resources to transmit data.

After the technical solutions of the embodiments of the present invention are adopted, the base station allocates the time-frequency resources in the specific bandwidth to the terminal; after allocating timeslot resources to the terminal, determines the size of the resource allocation information according to the specific bandwidth; and sends the resource allocation information to the terminal to indicate the allocated resources. By the foregoing technical means, the size of the allocated resources may be indicated in the specific bandwidth, so that the indication information is not limited by the system bandwidth.

BRIEF DESCRIPTION OF THE DRAWINGS

To illustrate the technical solution of the embodiments of the present invention or the prior art more clearly, accompanying drawings to be used in the descriptions of the embodiments of the present invention or the prior art are briefly introduced in the following. Apparently, the accompanying drawings described below are only some embodiments of the present invention, and persons of ordinary skill in the art can derive other drawings according to these drawings without making creative efforts.

DETAILED DESCRIPTION OF THE EMBODIMENTS

The technical solutions in the embodiments of the present invention are described clearly and completely in the following in combination with the accompanying drawings in the embodiments of the present invention. Evidently, the described embodiments are only part of rather than all of the embodiments of the present invention. All other embodiments, which can be derived by those of ordinary skill in the art based on the embodiments of the present invention without creative efforts, shall fall within the protection scope of the present invention.

Embodiment 1

Figure 1:
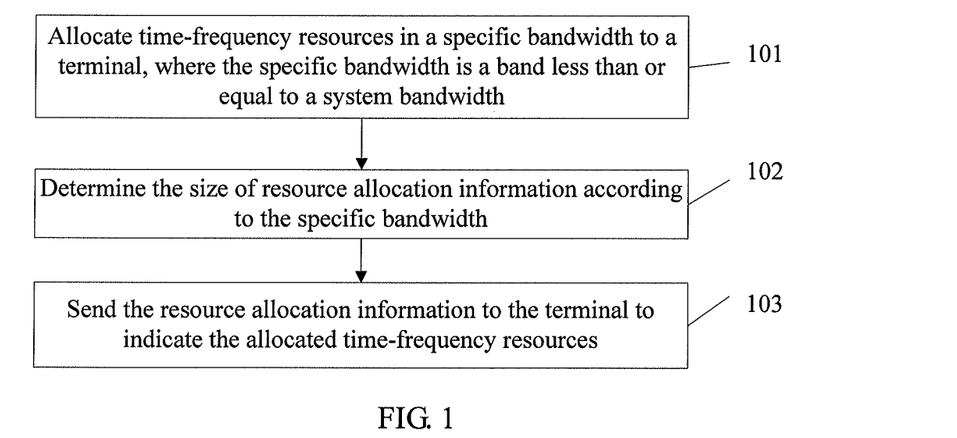
FIG. 1 is a flowchart of a resource allocation method on a base station side according to a first embodiment of the present invention.

An embodiment of the present invention provides a resource allocation method. As shown in FIG. 1, the method includes:

101: Allocate time-frequency resources in specific bandwidth to a terminal, where the specific bandwidth is a band less than or equal to system bandwidth.

102: Determine the size of resource allocation information according to the specific bandwidth.

103: Send the resource allocation information to the terminal to indicate the allocated time-frequency resources.

The base station may use any method in the prior art to send terminal resource allocation information to the terminal, which is not limited in the embodiment of the present invention. For example, in 3GPP (Third Generation Partnership Project, third generation partnership project) LTE (Long Term Evolution, long term evolution) REL-8 (release 8), the terminal resource allocation information is borne over a PDCCH (Physical Downlink Control Channel, physical downlink control channel); the terminal resource allocation information is multiplexed with another message into a transmission format indication data packet first, and then 16 CRC (Cyclic Redundancy Check, cyclic redundancy check) bits scrambled through a specific RNTI (Radio Network Temporary Identifier, radio network temporary identifier) are added into the data packet; and afterwards, the data packet undergoes processing, such as channel coding, rate matching, and modulation, and is then mapped to certain time-frequency resources and sent out.

Figure 2:
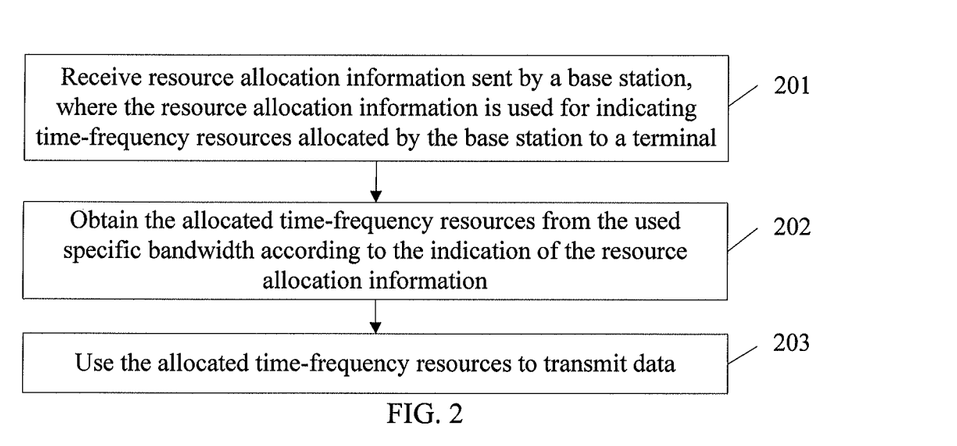
FIG. 2 is a flowchart of a resource allocation method on a terminal side according to the first embodiment of the present invention.

The embodiment of the present invention further provides a resource allocation method. As shown in FIG. 2, the method includes:

201: Receive resource allocation information sent by a base station, where the resource allocation information is used for indicating time-frequency resources allocated by the base station to a terminal.

202: Obtain the allocated time-frequency resources from used specific bandwidth according to the indication of the resource allocation information, where the specific bandwidth is a band less than or equal to system bandwidth.

203: Use the allocated time-frequency resources to transmit data.

In the embodiment of the present invention, the base station allocates time-frequency resources in specific bandwidth to the terminal; after allocating timeslot resources to the terminal, determines the size of the resource allocation information according to the specific bandwidth; and sends the resource allocation information to the terminal to indicate the allocated time-frequency resources. By the foregoing technical means, the size of the allocated resources may be indicated in the specific bandwidth, so that indication information is not limited by the system bandwidth, and the following problem is solved: The size of the resource allocation indication information increases with the increase of transmission bandwidth, and redundancy of processing layer signaling increases with the increase of the transmission bandwidth. If the specific bandwidth is less than the system bandwidth, when time-frequency resources are allocated to the terminal, the position of the allocated resources only needs to be indicated in the specific bandwidth, so that the size of the indication information that indicates the allocated time-frequency resources is reduced.

Embodiment 2

Figure 3:
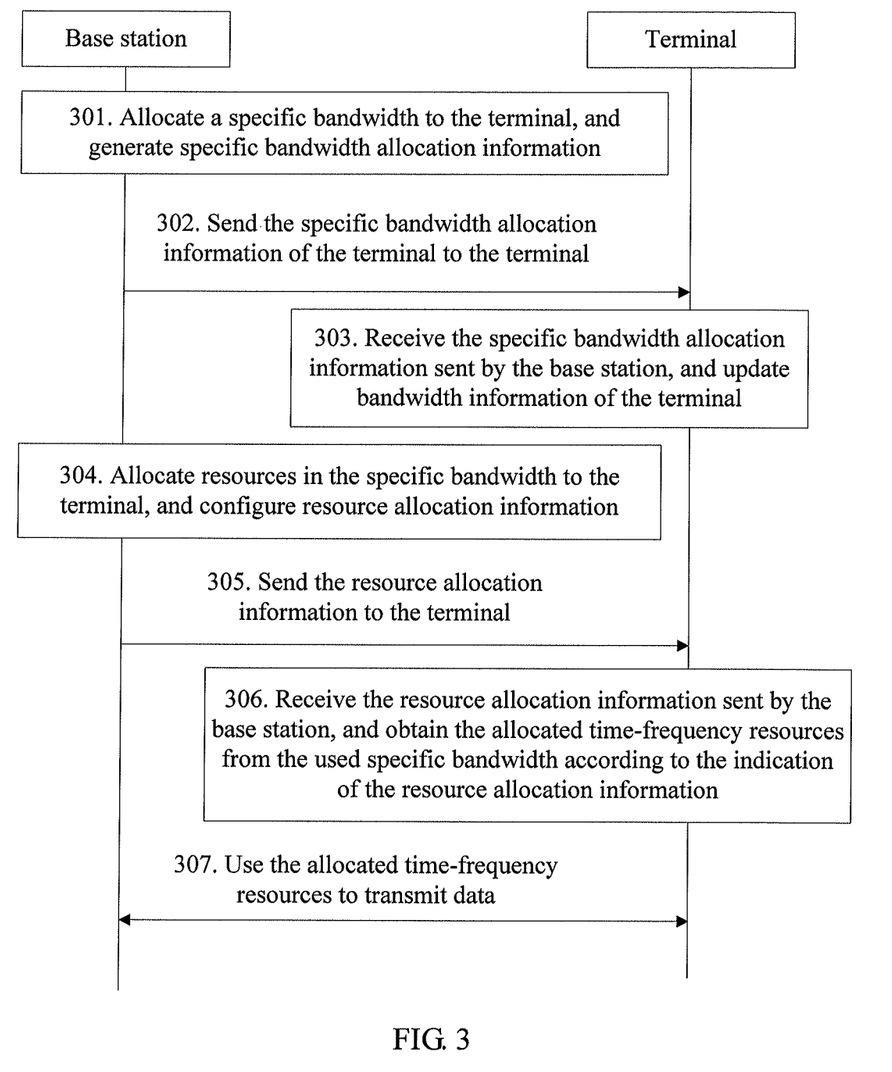
FIG. 3 is a schematic operation diagram of a resource allocation method according to a second embodiment of the present invention.

The embodiment of the present invention provides a resource allocation method. As shown in FIG. 3, the method includes:

301: A base station allocates specific bandwidth to a terminal according to a bandwidth requirement of the terminal, and configures specific bandwidth allocation information, where the specific bandwidth allocation information includes the size of the specific bandwidth and a position of the specific bandwidth in system bandwidth.

The specific bandwidth is bandwidth less than or equal to the system bandwidth, and the specific bandwidth is indicated by its size and its position in the system bandwidth. The size of the specific bandwidth may be specifically determined by the base station according to the bandwidth requirement of a terminal service. The base station may estimate a near-term bandwidth requirement of the terminal. For example, a maximum value of a frequency resource required by the terminal in a time period, plus a certain margin, is taken as the size of the specific bandwidth of the terminal. The position of the specific bandwidth may be specifically determined by the base station according to the scheduling of radio resources of the base station.

In the embodiment of the present invention, a case that the bandwidth required by the terminal service in a 3GPP (Third Generation Partnership Project, third generation partnership project) system is less than 4 MHz is specifically taken for example. The detailed process of allocating specific bandwidth to the terminal according to the service bandwidth requirement of the terminal includes: In the 3GPP system, an RB (Resource Block, resource block) is served as a resource allocation unit, one RB is a subframe in time and is 12 sub-carriers in frequencies, the bandwidth of each subcarrier is 15 KHz, and 1 RB is equivalent to 180 KHz in frequencies; according to the foregoing conversion relationships, it is found that a resource size corresponding to a service bandwidth of 4 MHz is about 23 RBs, and after a certain margin is added, specific bandwidth of 25 RBs may be allocated to the terminal. The base station may determine the position of the specific bandwidth according to the total radio resource allocation performed by the base station.

The size of the specific bandwidth and the position of the specific bandwidth in the system bandwidth may be used for indicating the specific bandwidth allocation information of the terminal. Specifically, the following is included: a start position of the specific bandwidth and the size of the specific bandwidth are set, where the size of the specific bandwidth may be an absolute bandwidth value, for example, 4500 indicating a bandwidth of 4.5 MHz, or the size of specific bandwidth may be the number of RBs occupied by the specific bandwidth; or, a start position and an end position of the specific bandwidth are set. In the 3GPP system, because the minimum unit of resource allocation is an RB, the position and the size of the specific bandwidth may be set by using a sequence number of the RB in the start position of the specific bandwidth and the number of RBs of the specific bandwidth.

The base station may, in a manner of adding an information element, generate the specific bandwidth allocation information to indicate the size of the specific bandwidth and the position of the specific bandwidth in the system bandwidth. The description and the format of the information element are as follows:

```
--ASN1START
UESpecificInfoConfig ::=    SEQUENCE {
Pos-UESpecifcBW             INTERGER(0,...,109),
UESpecifcBW                 INTERGER(1,...,110)
}
--ASN1STOP
```

Fields in UESpecificInfoConfig are described as follows:

Pos-UESpecificBW: used for setting the start position of the specific bandwidth, where the start position is indicated by a sequence number of the start RB of the specific bandwidth, its minimum value is 0, which indicates a first RB, and the maximum value is the system bandwidth of the base station.

UESpecifcBW: used for setting the size of the specific bandwidth with an RB as a unit, where its minimum value is 1, and the maximum value is the system bandwidth of the base station.

Further, in the process of configuring the specific bandwidth allocation information, the effective time of the specific bandwidth may be configured. If the effective time is not configured, it indicates that the size and position of the specific bandwidth take effect when the terminal receives the configuration information which is about the size and position of the specific bandwidth and sent by the base station. If the effective time is included, it may be set that the effective time may be several subframes or several frames after the terminal receives the configuration information which includes the size and position of the specific bandwidth and sent by the base station, or may be time with a frame number of a specific subframe or a specific frame. Here, a case that the effective time is several subframes after the subframe of the configuration information is taken for example. The message format is designed as follows:

UESpecificInfoConfig is used for setting terminal-specific bandwidth. Its format is:

```
--ASN1START
UESpecificInfoConfig ::= SEQUENCE {
Pos-UESpecificBW INTERGER(0,...,109),
    UESpecifcBW INTERGER(1,...,110),
    UESpecifcBWActiveSFN INTERGER(0,...,1023)    OPTIONAL
    UESpecicBWActiveSubframe INTERGER(0,...,7)   OPTIONAL
}
--ASN1STOP
```

Fields in the UESpecificInfoConfig are described as follows:

Pos-UESpecificBW: used for setting the start position of the specific bandwidth, where the start position is indicated by the sequence number of the start RB of the specific bandwidth.

UESpecifcBW: used for setting the size of the specific bandwidth, with an RB as a unit.

UESpecifcBWActiveSFN: used for setting an effective system frame number of the specific bandwidth.

UESpecicBWActiveSubframe: used for setting an effective subframe number of the specific bandwidth.

Further, the base station may set specific bandwidth for the uplink and the downlink of the terminal, or set only the specific downlink bandwidth of the terminal and uses the system bandwidth or the standard bandwidth of the base station in the uplink of the terminal, or, set only the specific uplink bandwidth of the terminal and uses the system bandwidth of the base station in the downlink of the terminal, which is not limited in the embodiment of the present invention. If the specific uplink bandwidth and specific downlink bandwidth of the terminal are set separately, a specific RRC message format is as follows:

```
--ASN1START
    UESpecificInfoConfig ::= SEQUENCE {
        UESpecificBWConfig-DL UESpecificBWConfig-DL
        OPTIONAL, --
NEED ON
    UESpecificBWConfig-UL UESpecificBWConfig-UL OPTIONAL, NEED
ON
    }
    UESpecificBWConfig-DL ::= CHIOCE {
    Release  NULL,
    Setup    SEQUENCE {
    Pos-UESpecificBW-DL INTERGER(0,...,109),
        UESpecifcBW-DL INTERGER(1,...,110),
        }
    }
    UESpecificBWConfig-UL ::= CHIOCE {
    Release  NULL,
    Setup    SEQUENCE {
    Pos-UESpecificBW-UL INTERGER(0,...,109),
        UESpecifcBW-UL INTERGER(1,...,110),
        }
    }
--ASN1STOP
```

The specific bandwidth of the terminal may be configured flexibly. That is, the size and the position may be configured as any reasonable value less than or equal to the system bandwidth, or the size of the specific bandwidth of the terminal may be set to a fixed value, so as to further reduce redundancy of the signaling required for transmitting the specific bandwidth. For example, 100 RBs of the base station are divided into 4 parts fixedly, and each part is 25 RBs, and then, one specific bandwidth may be indicated by 2 bits. Bits 00 indicate that the specific bandwidth is the band of the first 25 RBs, bits 01 indicate the band of the second 25 RBs, and likely, bits 10 indicate the band of the third 25 RBs, and bits 11 indicate the band of the fourth 25 RBs. Alternatively, the resolution of the specific bandwidth may be modified to reduce the required redundancy of the signaling for transmitting the specific bandwidth. For example, the minimum unit of the terminal-specific bandwidth is 10 RBs. That is, the terminal-specific bandwidth is 10 RBs, 20 RBs, 25 RBs, and so on. It is assumed that the base station has 100 RBs, then 4 bits are used to indicate a start position, 4 bits are used to indicate the size of the terminal-specific bandwidth, and 8 bits are in total. For example, it is assumed that the terminal-specific bandwidth is 20 RB-49 RB, then 4 bits 0010 are used to indicate that the specific bandwidth starts from the 20th RB, and 4 bits 0011 are used to indicate that the size of the terminal-specific bandwidth is 30 RBs. The size and the position of the terminal-specific bandwidth may be indicated in many other ways, which are not detailed one by one in the embodiment of the present invention.

The base station may also configure multiple types of terminal-specific bandwidth for the terminal. Taking the foregoing fixed division for example, the first 25 RBs and the third 25 RBs may be allocated to the terminal.

The base station may also not configure specific bandwidth, and when no specific bandwidth is configured for the terminal, the bandwidth of the terminal is the system bandwidth of the base station or the standard bandwidth within the system bandwidth of the base station. By default, before the base station sends the specific bandwidth of the terminal, or, if the base station does not configure specific bandwidth for the terminal, the base station allocates resources in the standard bandwidth or system bandwidth of the base station to the terminal.

302: The base station sends the specific bandwidth allocation information to the terminal.

When the specific bandwidth allocation information is sent to the terminal, the specific bandwidth allocation information may be sent to the terminal through physical layer signaling, or MAC layer signaling, or higher-layer signaling, which is not limited in the embodiment of the present invention.

The base station may update the size of the terminal-specific bandwidth according to a change of a bandwidth requirement of the terminal, or update the size and the position of the terminal-specific bandwidth according to a resource scheduling requirement of the base station. Each time when the terminal-specific bandwidth changes, the base station may instruct, through physical layer signaling, or MAC layer signaling, or higher-layer signaling, the terminal to perform updating. Taking the instruction through higher-layer signaling for example, the specific bandwidth message of the terminal may be updated at the time of RRC connection establishment, RRC connection reconfiguration or RRC connection reestablishment, or at other time involving radio resource configuration or reconfiguration.

303: The terminal receives the specific bandwidth allocation information sent by the base station. The specific bandwidth allocation information includes the size of the specific bandwidth and the position of the specific bandwidth in the system bandwidth.

The terminal updates the bandwidth information of the terminal according to the size of the specific bandwidth and the position of the specific bandwidth in the system bandwidth.

Further, if the base station configures the effective time of the specific bandwidth when configuring the specific bandwidth allocation information, the received specific bandwidth allocation information further includes the effective time of the specific bandwidth.

Figure 4:
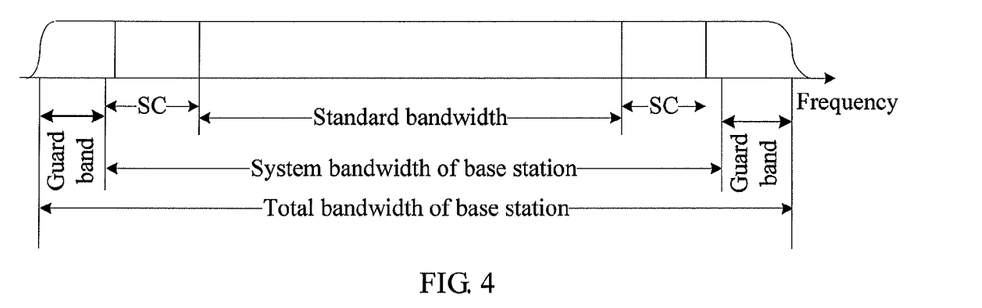
FIG. 4 is a diagram of base station bandwidth distribution according to the second embodiment of the present invention.

Moreover, before receiving the specific bandwidth allocation information sent by the base station, the terminal uses the standard bandwidth of the base station as its own specific bandwidth. In 3GPP LTE, the standard bandwidth of the base station is sent in a system broadcast message, and includes six types: 6 RBs, 15 RBs, 25 RBs, 50 RBs, 75 RBs, and 100 RBs. In the 3GPP LTE REL-10 and later versions, the bandwidth available for transmission beyond the standard bandwidth of the base station is called a segment carrier (Segment Carrier), and the corresponding RB is called extra RB (Extra RB), as shown in FIG. 4. The system bandwidth here refers to the total bandwidth which a base station and the terminal served by the base station may use for transmitting signals. The system bandwidth plus a guard band makes the total bandwidth of the base station. The standard bandwidth refers to the supported bandwidth as defined in a standard. For example, in the 3GPP LTE, the standard bandwidth of the base station is sent in a system broadcast message, and includes six types: 6 RBs, 15 RBs, 25 RBs, 50 RBs, 75 RBs, and 100 RBs. If the system bandwidth of the baseband equals the standard bandwidth, that is, extra RBs defined by the base station apart from the six standard RBs, the base station's standard bandwidth used for transmitting data, plus a guard band, is called standard bandwidth. For example, in the 3GPP LTE, the bandwidth corresponding to 6 RBs, 15 RBs, 25 RBs, 50 RBs, 75 RBs, and 100 RBs is 1.4 MHz, 3 MHz, 5 MHz, 10 MHz, 15 MHz, and 20 MHz, respectively. Unless otherwise specified, the bandwidth mentioned in the embodiment of the present invention refers to the bandwidth actually available for transmitting data, and does not include the guard band.

304: Allocate resources in the specific bandwidth to the terminal, and generate the terminal resource allocation information used for indicating the time-frequency resources allocated to the terminal within the specific bandwidth.

Figure 5:
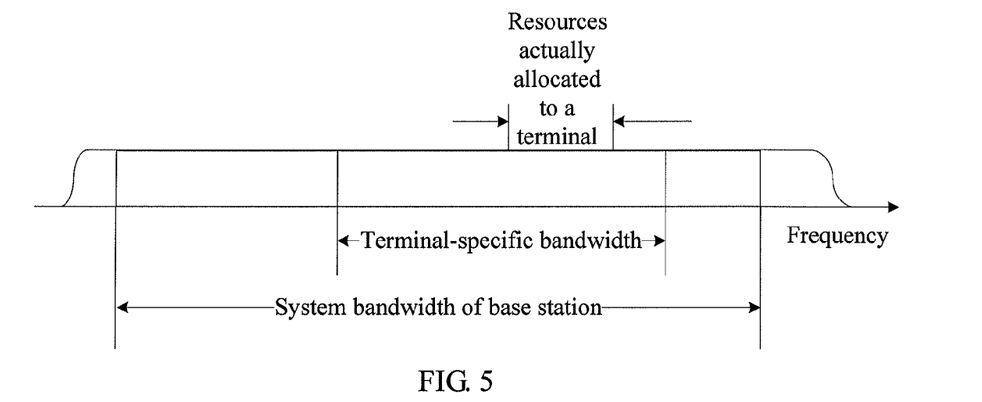
FIG. 5 is a schematic diagram of allocating specific bandwidth according to an actual service requirement of a terminal according to the second embodiment of the present invention.

There are many methods for allocating resources to the terminal. Any method in the prior art may be used for implementing the allocation of timeslot resources in the embodiment of the present invention. When allocating resources to the terminal within the specific bandwidth, the base station may allocate resources to the terminal, according to the bandwidth required by current actual traffic of the terminal, in combination with scheduling information. For example, the size of the specific bandwidth is 25 RBs, but the current actual traffic of the terminal requires only 6 RBs allocated, then the base station selects 6 RBs properly in the specific bandwidth and allocates the 6 RBs to the terminal, as shown in FIG. 5. Resource allocation belongs to the prior art, and reference may be made to settings in some existing protocols, such as 3GPP LTE REL-8 protocol, which is not detailed any further in the embodiment of the present invention.

The generating the terminal resource allocation information includes: determining the size of the resource allocation information according to the specific bandwidth, and generating the resource allocation information according to the time-frequency resources allocated to the terminal and the size of the resource allocation information. The determining the size of the resource allocation information according to the specific bandwidth specifically is: determining the size of the resource allocation information according to the size of the specific bandwidth and a resource allocation manner. The process of calculating the size of the resource allocation information according to the size of the specific bandwidth and the resource allocation manner is similar to that in the prior art except that, in the embodiment of the present invention, the size of the resource allocation information is calculated according to the specific bandwidth, while in the prior art, the size of the resource allocation information is calculated according to the system bandwidth. The process that the base station generates the resource allocation information according to the allocated timeslot resources is also similar to that in the prior art, but the resource allocation information is generated according to the specific bandwidth, while the resource allocation information is generated according to the system bandwidth in the prior art. For obtaining the size of the resource allocation information according to the size of the specific bandwidth, the following method may be used, including: determining terminal resource allocation granularity corresponding to the specific bandwidth, according to the specific bandwidth and according to a preset mapping relationship between the specific bandwidth and the terminal resource allocation granularity; and dividing the specific bandwidth by the determined terminal resource allocation granularity to obtain the size of the resource allocation information. However, in the embodiment of the present invention, the obtaining the size of the resource allocation information according to the size of the specific bandwidth is not confined to the foregoing method, and any method in the prior art may be used in the embodiment of the present invention, which is not limited in the embodiment of the present invention.

In the embodiment of the present invention, an implementation manner for allocating resources to the terminal in the specific bandwidth and generating the terminal resource allocation information is specifically described by taking downlink resource allocation TYPE (type) 0 in 3GPP LTE REL-8 for example. In the resource allocation of the downlink resource allocation TYPE (type) 0 in 3GPP LTE REL-8, each P RBs in all the $N_{DL}^{RB}$ RBs makes a group, which is called an RBG (Resource Block Group). Table 1 shows values of P. $N_{DL}^{RB}$ is the system bandwidth of the base station, and $$N_{RBG} = \lceil N_{RB}^{DL} / P \rceil$$

i indicates the number of RBGs in the system bandwidth of the base station. A bitmap (bitmap) with the size being $N_{RBG}$ is used to indicate whether one RBG is allocated to the terminal. The RBGs are numbered in ascending order according to frequencies. RBG 0 is mapped to the most significant bit of the bitmap used for indicating RBG allocation. If a bit in an RBG allocation bitmap is 1, it indicates that the RBG is allocated to the terminal. In the embodiment of the present invention, when resources are allocated to the terminal, the resources are allocated to the terminal within the specific bandwidth. If the specific downlink bandwidth of the terminal is $N_{DL}^{RB}$ RBs, the size of a resource allocation message is calculated by using the specific bandwidth $N_{DL,ue}^{RB}$. That is, each P RBs in the $N_{DL}^{RB}$ RBs in the specific bandwidth are grouped into one RBG. Table 2 shows the values of P. The size of a last RBG is $N_{DL,ue}^{RB}$ mod P, where mod indicates modular operation.

$$N_{RBG,ue} = \lceil N_{RB,ue}^{DL} / P \rceil$$

is used for indicating the number of RBGs in the specific bandwidth. A bitmap (bitmap) with the size being $$N_{RGB,ue} = \lceil N_{RB,ue}^{DL} / P \rceil$$

is used to indicate whether an RBG is allocated to the terminal. The RBGs are numbered in ascending order according to frequencies. RBG 0 is mapped to the most significant bit of the bitmap used for indicating the RBG allocation. If a bit in the RBG allocation bitmap is 1, it indicates that the RBG is allocated to the terminal. Taking $N_{DL}^{RB}=100$ RBs and $N_{DL,ue}^{RB}=25$ RBs for example, the 3GPP REL-8 adopts $N_{DL}^{RB}$, and the number of bits occupied for transmitting resource allocation information of TYPE 0 is 25 bits; while in the embodiment of the present invention, $N_{DL,ue}^{RB}$ is used, and only 13 bits are needed. It is assumed that the resources allocated by the base station to the terminal are a 3rd RBG, 6th RBG, and 8th RBG, and then a resource allocation message bitmap is 0010010100000 according to a resource message expression manner of TYPE 0. For other downlink resource allocation manners defined in the 3GPP LTE, the specific bandwidth size $N_{DL,ue}^{RB}$ is used for replacing the system bandwidth $N_{DL}^{RB}$ of the base station at the time of generating the resource allocation message. For an uplink resource allocation manner defined in the 3GPP LTE, a specific uplink bandwidth size $N_{UL,ue}^{RB}$ of the terminal is used for replacing an uplink bandwidth $N_{UL}^{RB}$ of the base station at the time of generating the resource allocation message, which is not detailed any further in the embodiment of the present invention.

TABLE 1

| System Bandwidth $N_{RB}^{DL}$ | RBG Size (P) |
| --- | --- |
| ≤10 | 1 |
| 11~26 | 2 |
| 27~63 | 3 |
| 64~110 | 4 |

TABLE 2

| Terminal-specific bandwidth $N_{DL,ue}^{RB}$ | RBG Size (P) |
| --- | --- |
| ≤10 | 1 |
| 11~26 | 2 |
| 27~63 | 3 |
| 64~110 | 4 |

Figure 6:
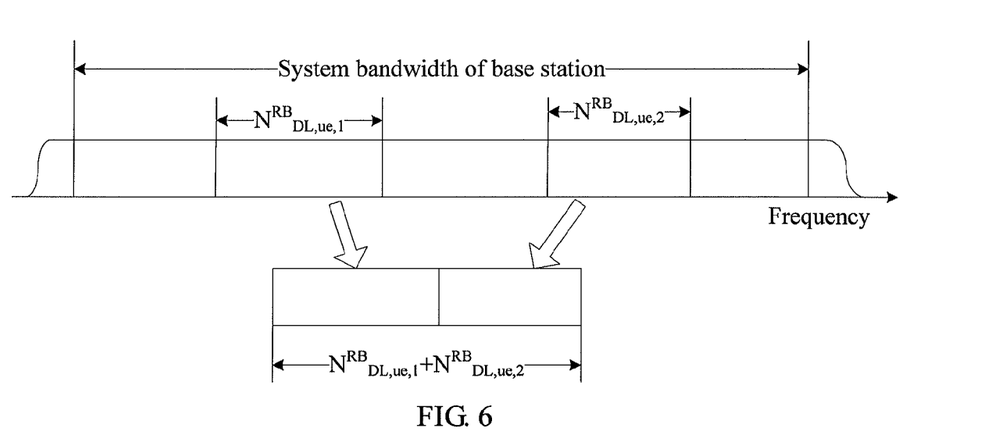
FIG. 6 is a schematic diagram of combining two discontinuous specific bandwidth allocated to a terminal into one virtual specific bandwidth according to the second embodiment of the present invention.

In addition, if the base station configures multiple specific bandwidth for the terminal, the size of a terminal resource allocation message is calculated according to the total bandwidth. It is assumed that the specific bandwidth configured by the base station for the terminal is $N_{DL,ue,1}^{RB}$ RBs and $N_{DL,ue,1}^{RB}$ RBs, the size of the resource allocation message is calculated according to ($N_{DL,ue,1}^{RB}+N_{DL,ue,2}^{RB}$) RBs. The base station maps multiple discontinuous bandwidth to one continuous virtual bandwidth, and then allocates resources on this virtual bandwidth and determines the size of the terminal resource allocation information according to the virtual bandwidth, as shown in FIG. 6.

305: Send the terminal resource allocation information to the terminal.

In the process that base station sends the terminal resource allocation information to the terminal, any method in the prior art may be used, which is not limited in the embodiment of the present invention. For example, in 3GPP LTE REL-8, the terminal resource allocation information is borne over a PDCCH; the terminal resource allocation information is multiplexed with another message into a transmission format indication data packet first, and then 16 CRC (Cyclic Redundancy Check, cyclic redundancy check) bits scrambled through a specific RNTI (Radio Network Temporary Identifier, radio network temporary identifier) are added into the data packet; and afterward, the data packet undergoes processing, such as channel coding, rate matching, and modulation, and is then mapped to certain time-frequency resources and sent out.

In the 3GPP LTE, the time-frequency resources available for PDCCH transmission are divided into a common search space and a dedicated search space. All terminals can perform receiving in the common search space; but only specific UE can perform receiving in the dedicated search space. The PDCCH sent in the dedicated search space is scrambled through a terminal-specific C-RNTI (Cell RNTI), or a terminal-specific temporary C-RNTI, or a terminal-specific SPS C-RNTI. The PDCCH sent in the common search space is scrambled through a non terminal-specific RNTI (such as SI-RNTI, P-RNTI, RA-RNTI, and SPS-RNTI), or a terminal-specific C-RNTI, or a terminal-specific temporary C-RNTI, or a terminal-specific SPS C-RNTI.

Further, before the base station sends the terminal-specific bandwidth, or, if the base station does not configure specific bandwidth for the terminal, the base station allocates resources in the standard bandwidth or system bandwidth of the base station to the terminal, calculates the size of the terminal resource allocation information according to the standard bandwidth or system bandwidth of the base station, and generates the terminal resource allocation information.

306: Receive the resource allocation information sent by the base station, and obtain the allocated time-frequency resources from used specific bandwidth according to the indication of the resource allocation information.

The terminal may calculate the size of the resource allocation information according to the size of the specific bandwidth; receive downlink control signaling according to the size of the resource allocation information; and parse the downlink control signaling and obtain the terminal resource allocation information sent by the base station. After the specific bandwidth of the terminal is configured, the size of the resource allocation information may be determined. Those skilled in the art can understand that it is not necessary to calculate the size of the resource allocation information each time when resources may be allocated. The size of the resource allocation information may be stored for next time use. How to parse the downlink control signaling and obtain the terminal resource allocation information sent by the base station is the prior art, and is not detailed in this embodiment. In an example, the size of the resource allocation information may be calculated according to the size of the specific bandwidth; the size of a data packet that includes the resource allocation information is determined according to the size of the resource allocation information and other information in a data transmission format; and the data packet of the downlink control signaling is received according to the size of the data packet that includes the resource allocation information, and the data packet of the downlink control signaling is parsed to extract the terminal resource allocation information sent by the base station. The process that the terminal obtains the size of the resource allocation information according to the size of the specific bandwidth is the same as the manner in which the base station obtains the size of the resource allocation indication information according to the size of the specific bandwidth, and the manner in which the terminal determines, according to the size of the resource allocation information and other information in the data transmission format, the size of the data packet that includes the resource allocation information, is the same as the manner in which the base station determines, according to the size of the resource allocation information and other information in the data transmission format, the size of the data packet that includes the resource allocation information. According to the content disclosed in this embodiment, those skilled in the art can learn how to obtain the corresponding time-frequency resources in the specific bandwidth, and the detailed implementation process is not detailed here further.

For obtaining the size of the resource allocation information according to the size of the specific bandwidth, the following method may be used, which includes: determining the terminal resource allocation granularity corresponding to the allocated terminal-specific bandwidth, according to the size of the terminal-specific bandwidth and according to a preset mapping relationship between the size of the terminal-specific bandwidth and the terminal resource allocation granularity; and dividing the size of the allocated terminal-specific bandwidth by the determined terminal resource allocation granularity to obtain the size of the resource allocation information. However, in the embodiment of the present invention, the obtaining the size of the resource allocation information according to the size of the specific bandwidth is not confined to the foregoing method, and any method in the prior art may be used in the embodiment of the present invention, which is not limited in the embodiment of the present invention.

The obtaining the allocated time-frequency resources from the used specific bandwidth according to the indication of the resource allocation information includes: According to the size of the resource allocation information, extracting the information with a corresponding size from the downlink control signaling received by the terminal; and parsing the extracted information to obtain the time-frequency resources of the terminal in the specific bandwidth.

In the embodiment of the present invention, searching for and receiving the terminal resource allocation information, which is sent by the base station, according to the size of the specific bandwidth is detailed with the 3GPP LTE as an example. In the 3GPP LTE, the PDCCH that bears the terminal resource allocation information has different formats. The terminal does not learn the size or position of a PDCCH packet data beforehand, but performs blind detection in a certain possible position of PDCCH transmission. When the terminal performs blind detection, the terminal needs to judge the size of a PDCCH data packet. In the embodiment of the present invention, when calculating the size of the PDCCH data packet, the terminal calculates the size of the terminal resource allocation information according to the specific bandwidth $N_{DL,ue}^{RB}$. For example, for PDCCH transmission format 1, the terminal calculates the value of P according to the specific bandwidth and on the basis of Table 2 in step 304; and then calculates the size $$N_{RBG,ue} = \lceil N_{RB,ue}^{DL} / P \rceil$$

of the resource allocation message according to the terminal-specific bandwidth and P; according to a message borne in another format 1, for example, 1-bit resource allocation header, 5-bit MCS (Modulation and Coding Scheme), 3-bit HARQ process number, 1-bit new data indicator (NDI, New Data Indicator), 2-bit redundancy version, 2-bit power control command, and other messages, calculates the total number of bits of the PDCCH format, and the terminal may calculate the code rate of the PDCCH format and perform further PDCCH decoding and detection to obtain the data packet that is sent by the base station and includes the terminal resource allocation information. After the number of bits of the PDCCH format is obtained, how to perform blind detection on the PDCCH belongs to the prior art, and is not detailed any further in the embodiment of the present invention.

After the PDCCH data packet that includes the terminal resource allocation information is obtained through correct decoding, the terminal parses the received terminal resource allocation information according to the specific bandwidth. As mentioned above, the PDCCH data packet is formed by multiplexing many pieces of signaling. The terminal obtains the content of each message according to the size of each message included in the PDCCH data packet. At the time of parsing, the terminal determines the size of the resource allocation message according to the terminal-specific bandwidth. It is assumed that: The size of the data packet of PDCCH format 1 is 48 bits; in a PDCCH data packet, the most significant bit is a 1-bit resource allocation header, used for indicating whether the resource allocation is type 0 or type 1, and the following is the resource allocation message. Therefore, the terminal learns, first according to the most significant bit which is the 1-bit resource allocation header, whether the resource allocation type is 0 or 1. It is assumed that the resource allocation header indicates that the resource allocation type is type 1, the terminal deems that the subsequent $$N_{RBG,ue} = \lceil N_{RB,ue}^{DL} / P \rceil$$

bits are the specific resource allocation message, and extracts the $$N_{RBG,ue} = \lceil N_{RB,ue}^{DL} / P \rceil$$

bits as its own resource allocation message. Taking $N_{DL,ue}^{RB}=25$ for example, the size of the resource allocation message is 13 bits, the 13 bits from a 2rd bit to a 14th bit of PDCCH format 1 received by the terminal are the resource allocation message. The terminal obtains the position of the received time-frequency resources in the terminal-specific band according to the content carried in the resource allocation message. It is assumed that the resource allocation message received by the terminal is binary numbers 0010010100000, the terminal may deem that it is needed to receive data at 3rd, 6th, and 8th RBGs in the specific bandwidth.

307: After obtaining the time-frequency resources of the terminal in the specific bandwidth, use the allocated time-frequency resources to transmit data. Where the using the allocated time-frequency resources to transmit data includes sending and receiving data.

Specifically, the using the allocated time-frequency resources to transmit data includes: adding the position of the time-frequency resources for the terminal to receive or send data in the specific bandwidth and the start position of the specific bandwidth in the system bandwidth of the base station, to obtain the position of the time-frequency resources in the system bandwidth of the base station; and receiving or sending a data signal at the time-frequency resources corresponding to the obtained position in the system bandwidth of the base station.

When the position of the time-frequency resource for the terminal to receive or send data in the specific bandwidth and the start position of the specific bandwidth in the system bandwidth of the base station are added to obtain the position of the time-frequency resources in the system bandwidth of the base station, the following method may be used, which specifically includes:

When the base station allocates specific bandwidth to the terminal, the following method may be used: It is assumed that the start position of the specific bandwidth is S, the position of the resource, which is allocated to the terminal, in the entire base station bandwidth is S plus the position of the terminal in the terminal-specific bandwidth.

Figure 7:
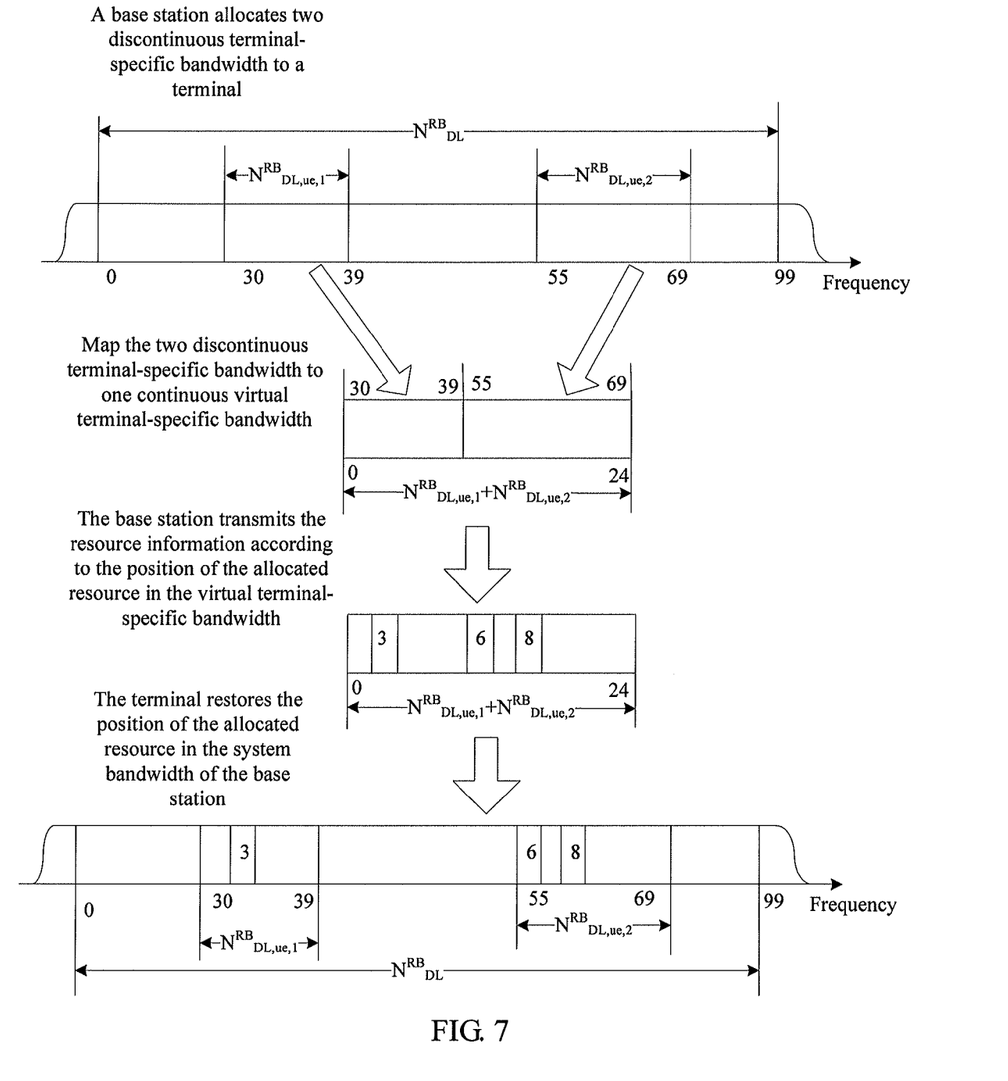
FIG. 7 is a diagram of a process that a terminal restores a position of an allocated resource in system bandwidth of a base station according to the second embodiment of the present invention.

When the base station allocates multiple discontinuous specific bandwidth to the terminal, if the specific bandwidth is multiple discontinuous bandwidth, the terminal adds different offsets to the position of the allocated resource in the specific bandwidth to obtain the position of the resource, which is allocated to the terminal, in the entire base station bandwidth. For example, it is assumed that the base station allocates two discontinuous specific bandwidth to the terminal, namely, bandwidth of 10 RBs from RB 30 to RB 39 RB, and bandwidth of 15 RBs from RB 55 to RB 69, when transmitting the resource allocation message, the base station maps the two discontinuous specific bandwidth to one continuous virtual specific bandwidth. The resource allocation message is transmitted according to the position of the allocated resource in the virtual bandwidth. Taking resource allocation TYPE 0 for example, the position of the time-frequency resource in the system bandwidth of the base station is restored according to the multiple discontinuous specific bandwidth, as shown in FIG. 7. It is assumed that the allocated resources are in the 3rd, 6th, 8th RBGs in the virtual bandwidth (the terminal-specific bandwidth is 10 RB+15 RB=25 RB, and according to Table 2, every 2 RBs make up an RBG). After receiving the resource allocation message, the terminal may determine, according to the position of the specific bandwidth, that the first RBG is in the first specific bandwidth, and that the second RBG and the third RBG are in the 2nd specific bandwidth. Then according to the position of the specific bandwidth, for the first RBG, the start position 30 of the first specific bandwidth is added to find, through calculation, that the allocated resources are the 34th RB and the 35th RB in the base station bandwidth. For the second RBG and the third RBG, the start position 55 of the second specific bandwidth is added to find, through calculation, that the allocated resources are the 55th RB, 56th RB, 59th RB, and 60th RB in the base station bandwidth. In this way, a signal is sent or received at set time-frequency resources.

Further, when the specific bandwidth is allocated to the terminal according to a service bandwidth requirement of the terminal, in a carrier aggregation mode, equal specific bandwidth is allocated to the terminal on multiple component carriers of the terminal according to the service bandwidth requirement of the terminal. Allocating same specific bandwidth to the terminal on different carriers here refers to: at least two carriers have equal terminal-specific bandwidth. For example, it is assumed that 5 carriers exist, it may be set that the terminal-specific bandwidth of carrier 1 is equal to that of carrier 2. Alternatively, carrier 1 and carrier 2 have equal terminal-specific bandwidth, and carrier 3 and carrier 4 have equal terminal-specific bandwidth, and so on.

In the embodiment of the present invention, the base station allocates the specific bandwidth to the terminal according to a service bandwidth request sent by the terminal, and allocates time-frequency resources in the specific bandwidth to the terminal; after allocating timeslot resources to the terminal, determines the size of the resource allocation information according to the specific bandwidth; and sends the resource allocation information to the terminal to indicate the allocated time-frequency resources. Therefore, the following problem is solved: The size of the resource allocation indication information increases with the increase of the transmission bandwidth, and redundancy of processing layer signaling increases with the increase of the transmission bandwidth. If the specific bandwidth is less than the system bandwidth, the position of the allocated resources only needs to be indicated in the specific bandwidth, when the time-frequency resources are allocated to the terminal, so as to reduce the size of the indication information that indicates the allocated time-frequency resources. When the specific bandwidth is allocated to the terminal, the specific bandwidth may be determined according to the terminal requirement, and therefore, the size of the allocation information is decided according to the terminal requirement and is not limited by the system bandwidth, and the size of the allocation information can be saved as much as possible. It can be understood that, in this embodiment, it is not necessary to allocate the specific bandwidth to the terminal before each time of resource allocation; after the specific bandwidth is configured, the specific bandwidth may be recorded by the terminal and the base station, so that next time the base station uses the specific bandwidth directly to allocate the time-frequency resources.

Moreover, in the prior art, in a multi-carrier aggregation system, each aggregated carrier may have different bandwidth. For example, a carrier with a bandwidth of 5 MHz is aggregated with a carrier with a bandwidth of 10 MHz. In this way, the number of bits of resource allocation corresponding to each carrier differs, which increases the complexity of detecting the resource allocation message. By contrast, in the embodiment of the present invention, for the same terminal, specific bandwidth of different carriers is equal, so that the number of bits of resource allocation corresponding to each carrier is the same, so as to reduce the complexity of detecting the terminal resource allocation information. Taking a case that 5 carriers are aggregated for example, it is assumed that one carrier is used for bearing PDCCH data packets of all other 4 carriers, and blind detection needs to be performed for 16 times for searching for a PDCCH of a kind of bandwidth in a terminal-specific search space, and if all the 4 carriers have different bandwidth, the number of times of blind detection that needs to be added is 4*16=64 according to the prior art. However, according to the embodiment of the present invention, it is set that terminal-specific bandwidth of two of the carriers are equal, that is, 4 carriers have only 3 different terminal-specific bandwidth, and then the number of times of blind detection can be reduced to 3*16=48. Further, 4 carriers are set to have only 2 different terminal-specific bandwidth, and then the number of times of blind detection can be reduced to 2*16=32. If all the 4 carriers have the same terminal-specific bandwidth, the number of times of blind detection is reduced to 16.

In the embodiment of the present invention, the bandwidth of the receiving filter and the sending filter of the terminal may be set as the system bandwidth of the base station. Because all OFDM subcarriers in the system bandwidth of the base station are orthogonal to each other, a signal outside the specific bandwidth does not cause interference to a signal in the terminal-specific bandwidth.

Embodiment 3

Figure 8:
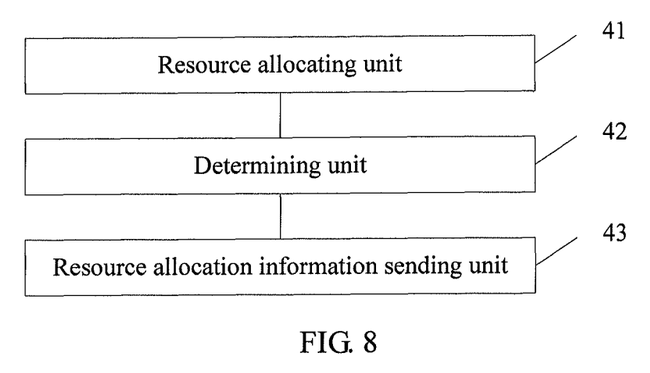
FIG. 8 is a composition block diagram of a base station according to a third embodiment of the present invention.

An embodiment of the present invention provides a base station. As shown in FIG. 8, the base station includes a resource allocating unit 41, a determining unit 42, and a resource allocation information sending unit 43.

The resource allocating unit 41 is configured to allocate time-frequency resources in specific bandwidth to a terminal, where the specific bandwidth is a band less than or equal to system bandwidth. The determining unit 42 is configured to determine the size of resource allocation information according to the specific bandwidth. The resource allocation information sending unit 43 is configured to send the resource allocation information to the terminal to indicate the allocated time-frequency resources. The resource allocation information sending unit 43 may send the terminal resource allocation information to the terminal by using any method in the prior art, and the embodiment of the present invention does not limit thereto. For example, in 3GPP LTE REL-8, the terminal resource allocation information is borne over a PDCCH (Physical Downlink Control Channel, physical downlink control channel); the terminal resource allocation information is multiplexed with another message into a transmission format indication data packet first, and then 16 CRC (Cyclic Redundancy Check, cyclic redundancy check) bits scrambled through a specific RNTI (Radio Network Temporary Identifier, radio network temporary identifier) are added into the data packet; and afterward, the data packet undergoes processing, such as channel coding, rate matching, and modulation, and is then mapped to certain time-frequency resources and sent out.

Figure 9:
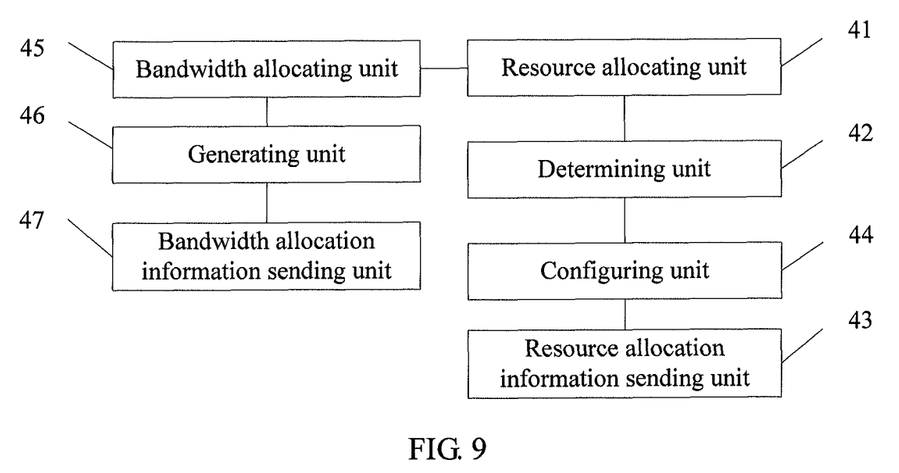
FIG. 9 is another composition block diagram of a base station according to the third embodiment of the present invention.

Further, as shown in FIG. 9, the base station includes a configuring unit 44. The configuring unit 44 is configured to: before the resource allocation information sending unit 43 sends the resource allocation information to the terminal, generate resource allocation information according to the time-frequency resources and the size of the resource allocation information, where the time-frequency resources are allocated by the resource allocating unit 41 to the terminal and the size of the resource allocation information is determined by the determining unit 42. The configuring unit 44 generating the terminal resource allocation information includes: determining the size of the resource allocation information according to the specific bandwidth; and generating the resource allocation information according to the time-frequency resources allocated to the terminal and the size of the resource allocation information. The determining the size of the resource allocation information according to the specific bandwidth specifically is: determining the size of the resource allocation information according to the size of the specific bandwidth and a resource allocation manner. The process of calculating the size of the resource allocation information according to the size of the specific bandwidth and the resource allocation manner is similar to that in the prior art except that, in the embodiment of the present invention, the size of the resource allocation information is calculated according to the specific bandwidth, while in the prior art, the size of the resource allocation information is calculated according to the system bandwidth. The process of the base station generating the resource allocation information according to the allocated timeslot resources is also similar to that in the prior art except that, the resource allocation information is generated according to the specific bandwidth, while in the prior art the resource allocation information is generated according to the system bandwidth. For obtaining the size of the resource allocation information according to the size of the specific bandwidth, the following method may be used, which includes: determining the terminal resource allocation granularity corresponding to the specific bandwidth, according to the specific bandwidth and according to a preset mapping relationship between the specific bandwidth and the terminal resource allocation granularity; and dividing the specific bandwidth by the determined terminal resource allocation granularity to obtain the size of the resource allocation information. However, in the embodiment of the present invention, the obtaining the size of the resource allocation information according to the size of the specific bandwidth is not confined to the foregoing method, and any method in the prior art may be used in the embodiment of the present invention, which is not limited in the embodiment of the present invention.

Further, as shown in FIG. 9, the base station further includes a bandwidth allocating unit 45, a generating unit 46, and a bandwidth allocation information sending unit 47.

The bandwidth allocating unit 45 is configured to allocate the specific bandwidth to the terminal according to a service bandwidth requirement of the terminal. The generating unit 46 is configured to generate specific bandwidth allocation information, where the specific bandwidth allocation information includes the size of the specific bandwidth and the position of the specific bandwidth in the system bandwidth of the base station, and the specific bandwidth is indicated by its size and its position in the system bandwidth. The size of the specific bandwidth may be specifically determined by the base station according to the bandwidth requirement of the terminal service. The base station may estimate a near-term bandwidth requirement of the terminal. For example, a maximum value of a frequency resource required by the terminal in a time period, plus a margin, is taken as the size of the specific bandwidth of the terminal. The position of the specific bandwidth may be specifically determined by the base station according to the scheduling of radio resources of the base station.

The bandwidth allocation information sending unit 47 is configured to send, to the terminal, the specific bandwidth allocation information generated by the generating unit 46. When sending the specific bandwidth allocation information to the terminal, the bandwidth allocation information sending unit 47 may send the specific bandwidth allocation information to the terminal through physical layer signaling, or MAC layer signaling, or higher-layer signaling, which is not limited in the embodiment of the present invention.

Each time when the specific bandwidth changes, the bandwidth allocation information sending unit 47 may instruct the terminal through physical layer signaling, or MAC layer signaling, or higher-layer signaling to perform updating. Taking the instruction through higher-layer signaling for example, the specific bandwidth message of the terminal may be updated at the time of RRC connection establishment, RRC connection reconfiguration or RRC connection reestablishment, or at other time involving radio resource configuration or reconfiguration.

Further, the generating unit 46 is further configured to generate the bandwidth allocation information that includes the effective time of the specific bandwidth. When the generating unit 46 generates the bandwidth allocation information that includes the effective time of the specific bandwidth, the resource allocating unit 41 is further configured to allocate resources in the specific bandwidth to the terminal within the effective time.

Further, the bandwidth allocating unit 45 is further configured to, in a carrier aggregation mode, allocate equal specific bandwidth to the terminal on multiple component carriers of the terminal according to the service bandwidth requirement of the terminal.

Figure 10:
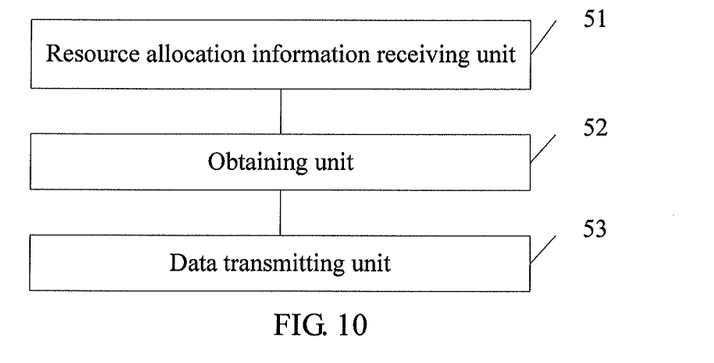
FIG. 10 is a composition block diagram of a terminal according to the third embodiment of the present invention.

The embodiment of the present invention further provides a terminal. As shown in FIG. 10, the terminal includes a resource allocation information receiving unit 51, an obtaining unit 52, and a data transmitting unit 53.

The resource allocation information receiving unit 51 is configured to receive resource allocation information sent by a base station, where the resource allocation information is used for indicating time-frequency resources allocated by the base station to the terminal; the obtaining unit 52 is configured to obtain the allocated time-frequency resources from used specific bandwidth according to the indication of the resource allocation information, where the specific bandwidth is a band less than or equal to system bandwidth; and the data transmitting unit 53 is configured to use the allocated time-frequency resources to transmit data, where the using the allocated time-frequency resources to transmit data includes sending and receiving the data. The data transmitting unit 53 using the allocated time-frequency resources to transmit data includes: adding the position of the time-frequency resources for the terminal to receive or send data in the specific bandwidth and the start position of the specific bandwidth in the system bandwidth of the base station, to obtain the position of the time-frequency resources in the system bandwidth of the base station; and receiving or sending a data signal at the time-frequency resources corresponding to the obtained position in the system bandwidth of the base station.

Figure 11:
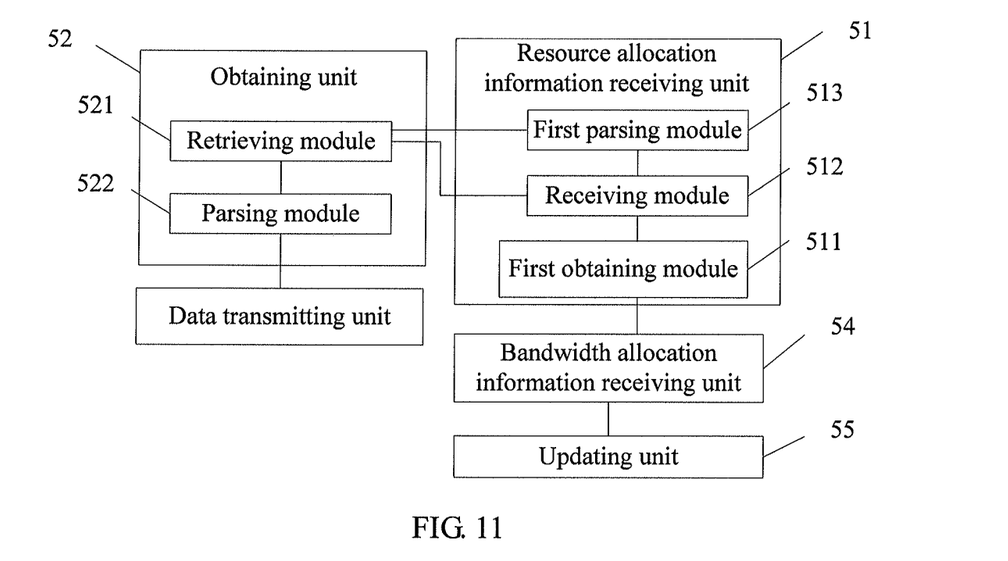
FIG. 11 is another composition block diagram of a terminal according to the third embodiment of the present invention.
Figure 12:
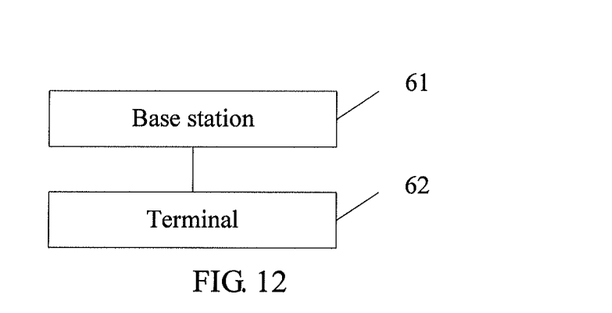
FIG. 12 is a composition block diagram of a resource allocation system according to the third embodiment of the present invention.

Further, as shown in FIG. 11, the terminal further includes a bandwidth allocation information receiving unit 54 and an updating unit 55.

The bandwidth allocation information receiving unit 54 is configured to: before the obtaining unit 52 obtains the allocated time-frequency resources from the used specific bandwidth according to the indication of the resource allocation information, receive the specific bandwidth allocation information sent by the base station, where the specific bandwidth allocation information includes the size of the specific bandwidth and the position of the specific bandwidth in the system bandwidth. The updating unit 55 is configured to update the specific bandwidth information of the terminal according to the size of the specific bandwidth and the position of the specific bandwidth in the system bandwidth of the base station.

As shown in FIG. 11, the resource allocation information receiving unit 51 includes a first obtaining module 511, a receiving module 512, and a first parsing module 513.

The first obtaining module 511 is configured to obtain the size of the resource allocation information according to the size of the specific bandwidth; the receiving module 512 is configured to receive downlink control signaling according to the size of the resource allocation information; and the first parsing module 513 is configured to parse the downlink control signaling received by the receiving module 512, to obtain the terminal resource allocation information sent by the base station. The receiving module 512 receiving the downlink control signaling according to the size of the resource allocation information includes: calculating the size of the resource allocation information according to the size of the specific bandwidth; determining the size of a data packet that includes the resource allocation information, according to the size of the resource allocation information and other information in a data transmission format; and receiving the data packet of the downlink control signaling according to the size of the data packet that includes the resource allocation information, and parsing the data packet of the downlink control signaling to extract the terminal resource allocation information sent by the base station.

For the first obtaining module 511 to obtain the size of the resource allocation information according to the size of the specific bandwidth, the following method may be used, which includes: determining terminal resource allocation granularity corresponding to the allocated terminal-specific bandwidth, according to the size of the terminal-specific bandwidth and according to a preset mapping relationship between the size of the terminal-specific bandwidth and the terminal resource allocation granularity; and dividing the size of the allocated terminal-specific bandwidth by the determined terminal resource allocation granularity to obtain the size of the resource allocation information. However, in the embodiment of the present invention, the obtaining the size of the resource allocation information according to the size of the specific bandwidth is not confined to the foregoing method, and any method in the prior art may be used in the embodiment of the present invention, which is not limited in the embodiment of the present invention.

As shown in FIG. 11, the obtaining unit 52 includes an extracting module 521 and a second parsing module 522.

The extracting module 521 is configured to extract the information of the corresponding amount from the downlink control signaling received by the receiving module 512, according to the size of the resource allocation information obtained by the first obtaining module 511; and the second parsing module 523 is configured to parse the information extracted by the extracting module 522, and obtain the time-frequency resources of the terminal in the specific bandwidth.

The embodiment of the present invention further provides a resource allocation system. As shown in FIG. 11, the system includes a base station 61 and a terminal 62.

The base station 61 is configured to: allocate time-frequency resources in specific bandwidth to the terminal 62, where the specific bandwidth is a band less than or equal to system bandwidth; determine the size of resource allocation information according to the specific bandwidth; and send the resource allocation information to the terminal 62 to indicate the allocated time-frequency resources.

The terminal 62 is configured to: receive the resource allocation information sent by the base station 61, where the resource allocation information is used for indicating the time-frequency resources allocated by the base station to the terminal 61; obtain the allocated time-frequency resources from used specific bandwidth according to the indication of the resource allocation information, where the specific bandwidth is a band less than or equal to the system bandwidth; and use the allocated time-frequency resources to transmit data.

In the embodiment of the present invention, the base station specifically allocates the specific bandwidth to the terminal according to the service bandwidth request sent by the terminal, and allocates time-frequency resources in the specific bandwidth to the terminal; after allocating timeslot resources to the terminal, determines the size of the resource allocation information according to the specific bandwidth; and sends the resource allocation information to the terminal to indicate the allocated time-frequency resources. Therefore, the following problem is solved: The size of the resource allocation indication information increases with the increase of the transmission bandwidth, and redundancy of processing layer signaling increases with the increase of the transmission bandwidth. If the specific bandwidth is less than the system bandwidth, the position of the allocated resources only needs to be indicated in the specific bandwidth when time-frequency resources are allocated to the terminal, so as to reduce the size of the indication information that indicates the allocated time-frequency resources. When the specific bandwidth is allocated to the terminal, the specific bandwidth may be determined according to a terminal requirement, so that the size of the allocation information is decided according to the terminal requirement and is not limited by the system bandwidth, and the size of the allocation information may be saved as much as possible.

Moreover, in the prior art, in a multi-carrier aggregation system, each aggregated carrier may have different bandwidth. For example, a carrier with a bandwidth of 5 MHz is aggregated with a carrier with a bandwidth of 10 MHz. In this way, the number of bits of resource allocation corresponding to each carrier differs, which increases the complexity of detecting a resource allocation message. By contrast, in the embodiment of the present invention, for the same terminal, specific bandwidth of different carriers are equal, so that the number of bits of resource allocation corresponding to each carrier is the same, so as to reduce the complexity of detecting the terminal resource allocation information. Taking a case that 5 carriers are aggregated for example, it is assumed that one carrier is used for bearing PDCCH data packets of all other 4 carriers, and blind detection needs to be performed for 16 times for searching for the PDCCH of a type of bandwidth in a terminal-specific search space, and if all the 4 carriers have different bandwidth, the number of times of blind detection that needs to be added is 4*16=64 according to the prior art. However, according to the embodiment of the present invention, it is set that terminal-specific bandwidth of two of the carriers is equal, that is, 4 carriers have only 3 different terminal-specific bandwidth, and then the number of times of blind detection can be reduced to 3*16=48. Further, 4 carriers may be set to have only 2 different terminal-specific bandwidth, and then the number of times of blind detection can be reduced to 2*16=32. If all the 4 carriers have the same terminal-specific bandwidth, the number of times of blind detection is reduced to 16.

In the embodiment of the present invention, the bandwidth of the receiving filter and the sending filter of the terminal may be set as the system bandwidth of the base station. Because all OFDM subcarriers in the system bandwidth of the base station are orthogonal to each other, a signal outside the specific bandwidth does not cause interference to a signal in the terminal-specific bandwidth.

Further, the base station uses the specific bandwidth to allocate resources to the terminal only when allocating terminal-specific dedicated resources to the terminal, for example, when transmitting a terminal-specific service; the base station uses the standard bandwidth or system bandwidth of the base station to allocate resources to the terminal when transmitting non terminal-specific data of the base station, such as a system message and a paging message. Specifically, in 3GPP LTE REL-8 and later versions, the standard bandwidth or system bandwidth of the base station may be used for transmitting the resource allocation message in a PDCCH common search space and used for the resource allocation corresponding to the resource allocation message; and the terminal-specific bandwidth may be used for the resource allocation message corresponding to a PDCCH dedicated search space and used for the corresponding resource allocation. In other words, the terminal-specific bandwidth may be used for all resource allocation messages in the PDCCH scrambled through a C-RNTI of the terminal and used for the corresponding resource allocation.

As for the terminal, the terminal uses the terminal-specific bandwidth to parse the resource allocation message only when receiving a terminal-specific service; the terminal uses the standard bandwidth or system bandwidth of the base station to parse the resource allocation message when receiving non terminal-specific data, such as a system message and a paging message. Specifically, in 3GPP LTE REL-8 and later versions, the terminal uses the standard bandwidth or system bandwidth of the base station to receive and parse the resource allocation message transmitted in the PDCCH common search space; and uses the terminal-specific bandwidth to receive and parse the resource allocation message corresponding to the PDCCH dedicated search space. In other words, the terminal uses the terminal-specific bandwidth to receive and parse a PDCCH scrambled through the C-RNTI of the terminal.

Further, the specific bandwidth of the terminal may be any bandwidth within the system bandwidth of the base station. When the system bandwidth of the base station is greater than the standard bandwidth of the base station, the specific bandwidth of the terminal may include a part or all of extended carriers outside the standard bandwidth.

Further, the base station configures the terminal-specific bandwidth for each terminal separately. Different terminals may have different sizes and/or different positions of specific bandwidth.

Further, in carrier aggregation, the base station divides all carriers into several sets. For example, downlink carrier sets includes a downlink configuration carrier set, a downlink activation carrier set, and a downlink monitoring carrier set. The downlink configuration carrier set refers to a carrier configured by the base station for the terminal to receive a PDSCH; the downlink activation carrier refers to a carrier that is activated for the terminal to receive the PDSCH and is in the downlink configuration carrier set; and the downlink monitoring carrier refers to a carrier through which the terminal receives the PDCCH. In this case, for the same terminal, the terminal-specific bandwidth may be configured on a certain downlink carrier set only, for example, the terminal-specific bandwidth is configured on the carrier of the downlink activation set only, and terminal-specific bandwidth configured for different carriers in the downlink activation set is equal; or, for the same terminal, the terminal-specific bandwidth may be only configured on each carrier in the downlink configuration carrier set, and terminal-specific bandwidth configured for different carriers in the downlink configuration carrier set is equal.

Similarly, in carrier aggregation, uplink carrier sets includes an uplink configuration carrier set, an uplink activation carrier set, and an uplink monitoring carrier set. The base station may also configure the terminal-specific bandwidth on a certain uplink carrier set only, and terminal-specific bandwidth configured for different carriers in this set is equal.

Further, in the embodiment of the present invention, the bandwidth of the receiving filter and the sending filter of the terminal may be set as the system bandwidth of the base station. If the terminal does not support an extended carrier, the bandwidth of the receiving filter and the sending filter of the terminal may be set as the standard bandwidth of the base station. Because all OFDM subcarriers in the system bandwidth of the base station are orthogonal to each other, a signal outside the specific bandwidth does not cause interference to a signal in the terminal-specific bandwidth.

Further, the feedback of CQI, or PMI or RI of the terminal is based on the specific bandwidth of the terminal. That is, the terminal only calculates the CQI/PMI or RI in the specific bandwidth, and feeds back the CQI/PMI or RI to the base station.

Further, RSRP measurement and RSSI measurement of the terminal are calculated based on the system bandwidth or standard bandwidth of the base station, or based on the specific bandwidth of the terminal.

Further, at the time of handover, a target base station may pre-configure the specific bandwidth of a UE. A source base station sends the terminal-specific bandwidth configured by the target base station to the terminal, so that the terminal uses the specific bandwidth after the terminal is handed over to the target base station; or, at the time of handover, the terminal uses the system bandwidth or standard bandwidth of the target base station to allocate resources and send and receive a resource allocation message, and after receiving the specific bandwidth configured by the target base station, the terminal uses the specific bandwidth to allocate resources and send and receive the resource allocation message.

Through the descriptions of the foregoing implementation manners, those skilled in the art can clearly understand that the embodiments of the present invention may be implemented by software plus necessary universal hardware or by hardware only, and in most cases, the former is preferred. Based on such understanding, the essence of the technical solution of the present invention or the part that makes contribution to the prior art may be embodied in a manner of a software product. The computer software product is stored in a computer-readable storage medium, such as computer floppy disk, hard disk or optical disk, and includes several instructions instructing a computer device (for example, personal computer, server, or network device) to execute the methods described in the embodiments of the present invention.

The foregoing descriptions are merely specific implementation manners of the present invention, but not intended to limit the protection scope of the present invention. Any variation or replacement that can be easily derived by those skilled in the art within technical scope disclosed in the present invention shall fall within the protection scope of the present invention. Therefore, the protection scope of the present invention is subject to the appended claims.

The invention claimed is:

1. In a cellular system, a method for allocating resources to terminals to communicate with a base station, the method executed by the base station, comprising:
    allocating multiple discontinuous bandwidths from a system bandwidth of the base station to a terminal;
    mapping the multiple discontinuous bandwidths to a continuous virtual bandwidth;
    obtaining allocating information including size information of
the continuous virtual bandwidth, size information of each discontinuous bandwidth, and position information of each discontinuous bandwidth in the system bandwidth;
    sending the allocating information to the terminal;
    allocating time-frequency resources in the continuous virtual bandwidth to the terminal;
    determining time-frequency resources allocation information indicating the allocated time-frequency resources according to allocated time-frequency resources and the size information of the continuous virtual bandwidth;
    sending the time-frequency resources allocation information to the terminal; and
    wherein:
        the allocating information of the multiple discontinuous bandwidths further comprises effective time of the multiple discontinuous bandwidths, and the allocating the time-frequency resources in the continuous virtual bandwidth to the terminal comprises allocating the time-frequency resources in the continuous virtual bandwidth to the terminal within the effective time.

2. The method according to claim 1, wherein: the allocating the multiple discontinuous bandwidths to the terminal comprises: allocating the multiple discontinuous bandwidths to the terminal according to a service requirement of the terminal.

3. A computer program product comprising a non-transitory computer readable storage medium storing one or more programs, the one or more programs comprising instructions, which when executed by a base station, cause the base station to perform a method comprising:
- allocating multiple discontinuous bandwidths from a system bandwidth of the base station to a terminal;
- mapping the multiple discontinuous bandwidths to a continuous virtual bandwidth;
- obtaining allocating information including size information of the continuous virtual bandwidth, size information of each discontinuous bandwidth, and position information of each discontinuous bandwidth in the system bandwidth;
- sending the allocating information to the terminal;
- allocating time-frequency resources in the continuous virtual bandwidth to the terminal;
- determining time-frequency resources allocation information indicating the allocated time-frequency resources according to the allocated time-frequency resources and the size information of the continuous virtual bandwidth;
- sending the time-frequency resources allocation information to the terminal; and
- wherein:
  - the allocating information of the multiple discontinuous bandwidths further comprises effective time of the multiple discontinuous bandwidths, and
  - the allocating the time-frequency resources in the continuous virtual bandwidth to the terminal comprises allocating the time-frequency resources in the continuous virtual bandwidth to the terminal within the effective time.

4. In a cellular system, a method for determining time-frequency resources allocated to a terminal to communicate with a base station, the method executed by the terminal, comprising:
- receiving, allocating information including size information of a continuous virtual bandwidth mapped to multiple discontinuous bandwidths allocated from a system bandwidth of the base station, size information of each discontinuous bandwidth, and position information of each discontinuous bandwidth in the system bandwidth;
- receiving, time-frequency resources allocation information indicating time-frequency resources allocated from the multiple discontinuous bandwidths by the base station;
- determining the time-frequency resources according to the time-frequency resources allocation information, the size information of a continuous virtual bandwidth, the size information of each discontinuous bandwidth, and the position information of each discontinuous bandwidth in the system bandwidth; and
- wherein:
  - the allocating information of the multiple discontinuous bandwidths further comprises effective time of the multiple discontinuous bandwidths, and
  - the determining the time-frequency resources in the continuous virtual bandwidth to the terminal comprises allocating the time-frequency resources in the continuous virtual bandwidth to the terminal within the effective time.

5. A computer program product comprising a non-transitory computer readable storage medium storing one or more programs, the one or more programs comprising instructions, which when executed by a terminal, cause the terminal to perform a method comprising:
- receiving, allocating information including size information of a continuous virtual bandwidth mapped to multiple discontinuous bandwidths allocated from a system bandwidth of a base station, size information of each discontinuous bandwidth, and position information of each discontinuous bandwidth in the system bandwidth;
- receiving, time-frequency resources allocation information indicating time-frequency resources allocated from the multiple discontinuous bandwidths by the base station;
- determining the time-frequency resources according to the time-frequency resources allocation information, the size information of a continuous virtual bandwidth, the size information of each discontinuous bandwidth, and the position information of each discontinuous bandwidth in the system bandwidth; and
- wherein:
  - the allocating information of the multiple discontinuous bandwidths further comprises effective time of the multiple discontinuous bandwidths, and
  - the determining the time-frequency resources in the continuous virtual bandwidth to the terminal comprises allocating the time-frequency resources in the continuous virtual bandwidth to the terminal within the effective time.

* * * * *